C. W. BREEN.
HOOK AND EYE.
APPLICATION FILED APR. 11, 1907.
908,733.
Patented Jan. 5, 1909.
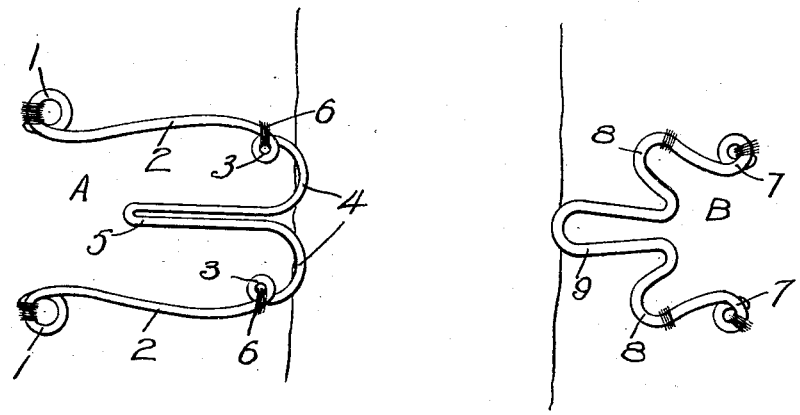
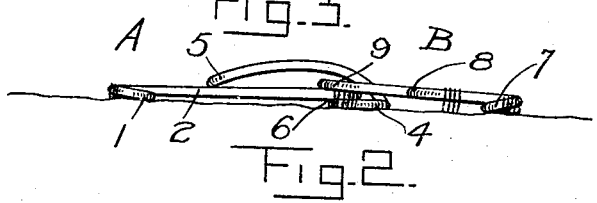
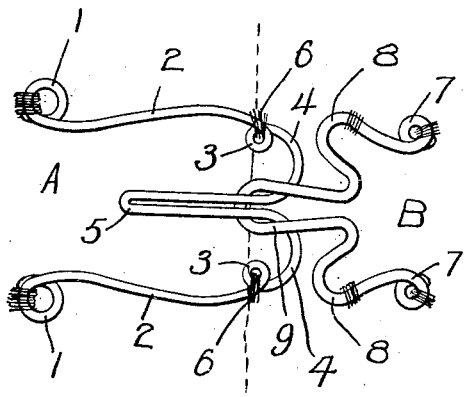
WITNESSES:
INVENTOR

UNITED STATES PATENT OFFICE.

CHARLOTTE W. BREEN, OF SAN JUAN BAUTISTA, CALIFORNIA.

HOOK AND EYE.

No. 908,733.　　　Specification of Letters Patent.　　　Patented Jan. 5, 1909.

Application filed April 11, 1907. Serial No. 367,520.

*To all whom it may concern:*

Be it known that I, CHARLOTTE W. BREEN, a citizen of the United States, residing at San Juan Bautista, in the county of San Benito, State of California, have invented certain new and useful Improvements in Hooks and Eyes; and I do hereby declare the following to be a full, clear, and exact description of the invention, such as will enable others skilled in the art to which it appertains to make and use the same.

This invention has relation to hooks to be used in connection with eyes for fastening together the opposite edges of a garment.

It is the object of the invention to provide improvements in a device of the character mentioned that will avoid the chafing and consequent wearing, by the eye, of the threads that hold the bill-bearing end of the hook down on the fabric.

The nature of the invention is fully and clearly ascertained from the device portrayed in the annexed drawings, forming a part of this specification, in view of which it will first be described with respect to its construction and mode of use, and then be pointed out in the subjoined claims.

Of the said drawings—Figure 1 is a plan of the improved hook separated from an eye with which it is to be engaged. Fig. 2 is also a plan but showing the hook and an eye engaged. Fig. 3 is an edge or side view of the assembled hook and eye.

Similar numerals of reference designate similar parts or features, as the case may be, wherever they occur.

In the drawings A designates the hook member and B an eye member. The hook is made from a length of wire, as is common, the terminals of which are formed into closed loops or eyes 1 constituting the rear end of said member. From the said eyes 1 the wires extend forward as shanks being first bowed outward slightly, as at 2, whence they are curled inward, forming complete rings or eyes 3 3. From the eyes 3 the wires on each side are bowed outward and then inward and backward, as at 4, from which points they are doubled to form the bill 5 of the hook.

The outer portion or base of the bill 5 extends between the eyes 3, through and over the outer sides of which the threads 6 are passed, which are sewed into the cloth to hold the hook end down on the garment. It is understood, of course, that the rear end of the hook is also sewed to the garment through the eyes 1. This condition thus affords four points or places for attaching the hook to the garment.

By observing the position of the parts as represented in Fig. 2 it will be noted that when the eye member is engaged with the bill 5 of the hook member, the inner sides of the eyes 3 act as guards to ward off contact of any part of the said eye member with the attaching threads 6, and thus chafing and abrasion of said threads by the eye member is avoided.

The prime object of the improvements is to keep the eye member from wearing the threads by which the hook is secured to the garment, for when they become loose or break away at the said points they cause much annoyance and lose much of their efficiency.

In Fig. 2 of the drawings, the dotted line indicates the position of the edge of the fabric to which the eye is attached, with respect to the hook when the hook and eye are engaged.

What is claimed is—

The combination with an eye of a hook consisting of a single strand of wire bent on itself to form oppositely disposed outwardly bowed shanks in spaced relation to each other and a central hook between said shanks, each shank being bent on itself to form spaced securing eyes, one eye located on the outside and the other on the inside of the shank and beyond its bowed portion.

In testimony whereof, I affix my signature, in presence of two witnesses.

CHARLOTTE W. BREEN.

Witnesses:
　LEAH M. BREEN,
　EILEEN BREEN.